United States Patent
Delgado-Carranza et al.

(10) Patent No.: US 6,341,502 B2
(45) Date of Patent: Jan. 29, 2002

(54) METHOD AND MACHINE FOR THE MANUFACTURING OF SYRINGES

(75) Inventors: Jose-De-Jesus Delgado-Carranza; Teodoro Rivas-Guzman; Armando Medina-Garcia, all of Querétaro (MX)

(73) Assignee: Ampolletas, S.A. DE C.V., Queretaro (MX)

( * ) Notice: Subject to any disclaimer, the term of this patent is extended or adjusted under 35 U.S.C. 154(b) by 0 days.

(21) Appl. No.: 09/196,386

(22) Filed: Nov. 19, 1998

(51) Int. Cl.[7] .................... C03B 23/11; C03B 23/055; C03B 23/045
(52) U.S. Cl. .................. 65/104; 65/109; 65/271; 65/272; 65/280
(58) Field of Search .................. 65/104, 105, 108, 65/109, 113, 120, 271, 272, 276, 277, 280, 284

(56) References Cited

U.S. PATENT DOCUMENTS

| | | | |
|---|---|---|---|
| 835,377 A | * | 11/1906 | Swan |
| 2,090,861 A | * | 8/1937 | Eisele |
| 2,199,332 A | * | 4/1940 | Dichter |
| 2,228,010 A | * | 1/1941 | Koenig |
| 2,392,104 A | * | 1/1946 | Smith |
| 2,537,660 A | * | 1/1951 | Eldred |
| 3,249,414 A | * | 5/1966 | Hamilton |
| 3,332,764 A | * | 7/1967 | Knox |
| 3,424,570 A | * | 1/1969 | Couquelet |
| 3,852,054 A | * | 12/1974 | Dichter |
| 3,939,626 A | * | 2/1976 | Cioni et al. |
| 3,985,535 A | * | 10/1976 | Bennett et al. |
| 4,080,189 A | * | 3/1978 | Dichter |
| 4,092,142 A | * | 5/1978 | Dichter |
| 4,096,683 A | * | 6/1978 | McMickle, Jr. |
| 4,142,883 A | * | 3/1979 | Dichter |
| 4,325,726 A | * | 4/1982 | Edwards et al. |
| 4,330,317 A | * | 5/1982 | Vertova |
| 5,779,753 A | * | 7/1998 | Vetter et al. |

* cited by examiner

*Primary Examiner*—Sean Vincent
(74) *Attorney, Agent, or Firm*—Abelman, Frayne & Schwab

(57) ABSTRACT

A method and an machine for the manufacturing of syringes by vertically feeding long glass tubes to an intermittently rotary forming machine, having two horizontally rotary machine sections each intermittently rotating on a central vertical axis of a stationary machine frame, to a plurality of forming stations, each machine section having a plurality of continuously rotary gripping chucks mounted on the stationary machine frame, a plurality of burner nozzles and a plurality of forming tools, for firstly opening a closed lower end of a glass tube, forming a tip for a needle at the lower end of the glass tube, cutting off a syringe body including the tip at a lower end, and then translating the syringe body to the second machine forming section for opening a closed upper end of the syringe body, forming a finger flange at the upper end of the syringe body and release the finished syringe body at a discharging machine.

32 Claims, 10 Drawing Sheets

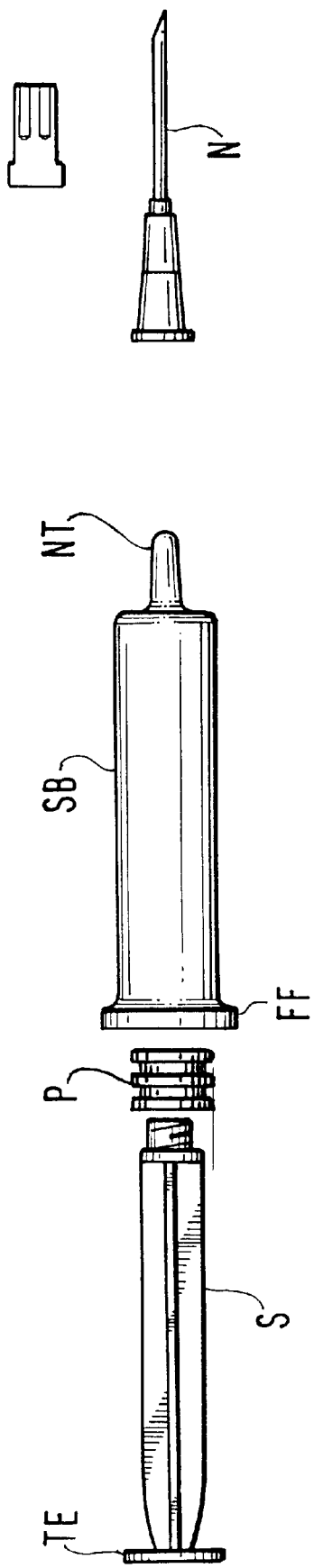

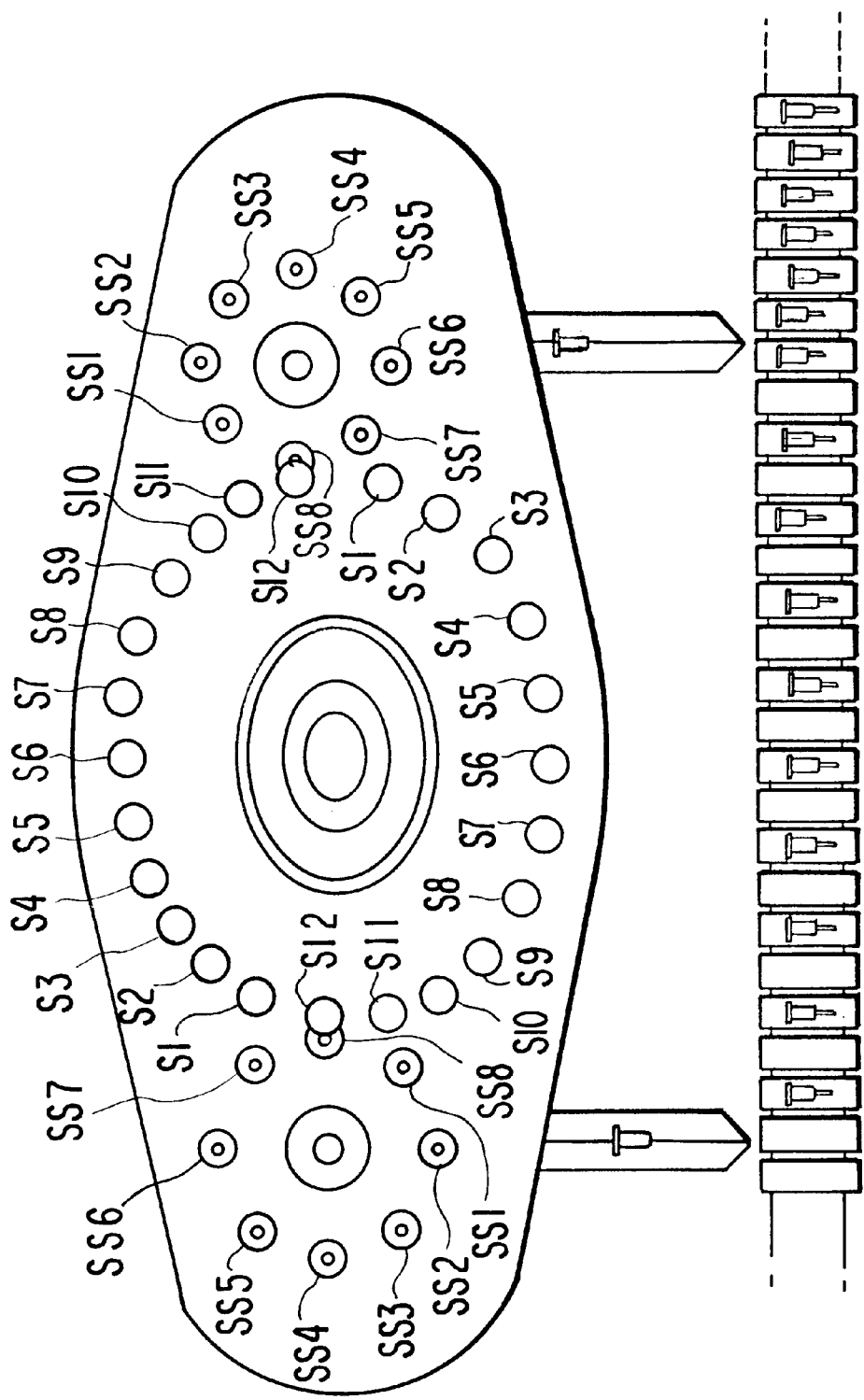

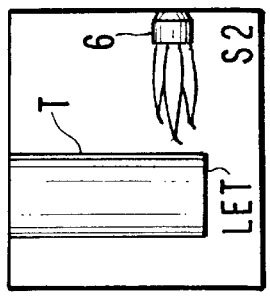
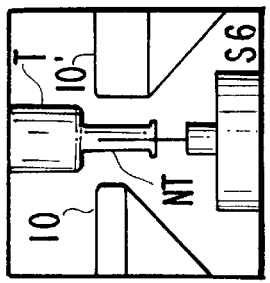
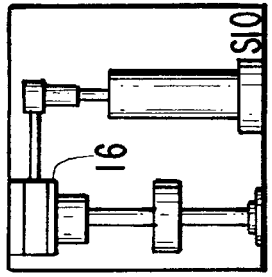
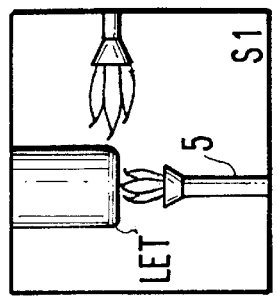
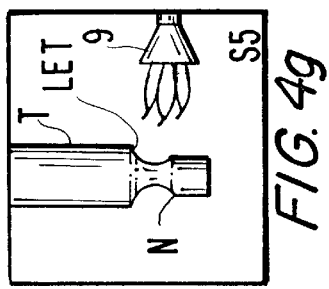
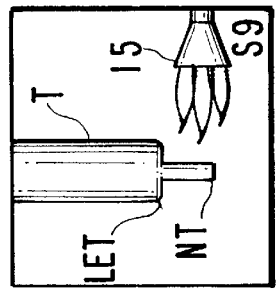
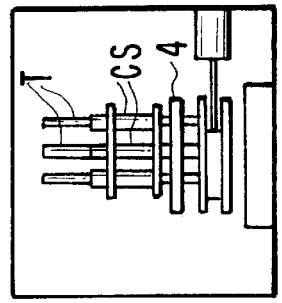
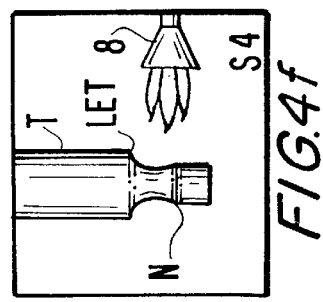
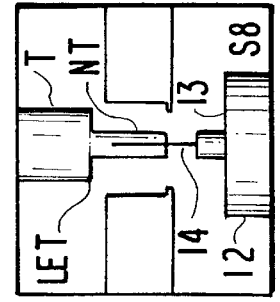
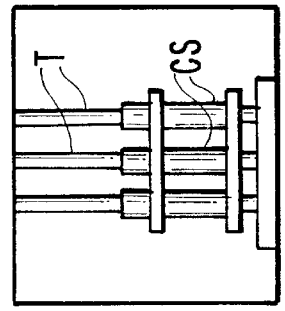
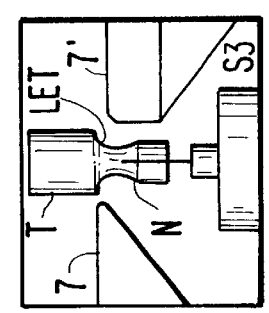
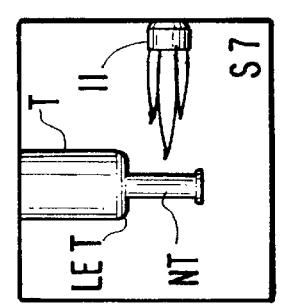

METHOD AND MACHINE FOR THE MANUFACTURING OF SYRINGES

BACKGROUND OF THE INVENTION

A. Field of the Invention

The present invention refers to a method and a machine for the manufacture of syringes and, more particularly, to a method and a machine for the manufacturing the syringe glass bodies from vertically fed long glass tubes in a horizontally rotary forming machine including two forming sections.

B. Description of the Related Art

Typical glass syringes normally comprises a tubular syringe body including a finger flange and a tip for a needle, a steel needle having a flared end to be inserted by pressure at the tip of the syringe body, a stem having a gum plunger at its rear end and a top flat end, which is normally introduced into the tubular syringe body, to complete the syringe.

The syringe body has been normally produced at an horizontal forming machine typically used for producing glass ampoules, from a short glass tube having a length equivalent to a twice length of the syringe body, which is horizontally feed to the forming machine from a horizontally stacked glass tube hopper.

In said horizontal forming machine, each glass tube is horizontally fed from the tube hopper to an intermittent advancing rack leading the tubes through a plurality of forming stations including a plurality of burner nozzles and forming tools. The tip portion of the syringe body is firstly formed at a first end of the glass tube at a first machine section, then the glass tube is lifted, horizontally rotated and lowered to be feed to a second longitudinal machine section, to form a tip portion at the second end of the glass tube, and then the glass tube having a tip portion formed at each end thereof, is cutoff by its middle portion to be independently processed to form the finger flange of the syringe body.

Forming and feeding short, double sized, glass tubes, has been an inconvenient step in the manufacturing of syringe glass bodies. Furthermore, the production capacity of these machines is limited because of the length of the forming machine.

The forming cycle in these machines may take a considerable time and may require independent machines for the formation of the finger flange at each of the two syringe bodies obtained from a glass tube.

Consequently, it would be highly desirable to produce finished glass syringe bodies including the tip portion and the finger flange, in a single forming machine, in a single forming cycle, from long glass tubes to avoid the necessity of forming short, double sized, glass tubes.

There are known in the art some intermittently rotary type forming machines for producing glass ampoules and vials, from a plurality of vertical long glass tubes, as those disclosed in the U.S. Pat. No. 4,080,189 and U.S. Pat. No. 4,092,142 both of Dichter, and 4,330,317 of Vertova.

These rotary machines normally include a stationary machine frame and an intermittently rotary machine frame, mounted on the stationary machine frame, rotating to a plurality of forming stations; a plurality of continuously rotary chucks equally mounted on the stationary machine frame, rotary gripping the glass tubes; a plurality of burner nozzles equally and stationary mounted on the stationary machine frame at the forming stations, providing a flame jet for heating, softening, forming and fire finishing the glass tubes or products, and forming rollers for forming the mouth of a vial.

These rotary forming machines have the enormous advantage that produce the ampoules or vials, continuously, from long glass tubes in a single machine and in a single forming cycle.

Researching about the way in which glass syringes could be formed in a single continuous forming cycle, form long glass tubes, applicants have developed a method for the continuous manufacturing of syringe bodies in a single forming cycle, which can be carried out in a single intermittently rotary type forming machine, by properly tooling the machine and complementing it with another forming section in order to form a finished syringe body at a high production velocity.

The method for the manufacturing of syringe bodies from a plurality of glass tubes in an intermittently horizontally rotary machine including a first and a second intermittently horizontally rotary machine sections, in accordance with the present invention, comprising: vertically placing a plurality of glass tubes in a first machine section of the intermittently horizontally rotary machine, intermittently rotating to a plurality of forming stations, mounted on a central axis of a stationary machine frame; continuously rotary holding each tube by means of rotary gripping chucks equally and stationary mounted on the stationary machine frame; translating a tube to a plurality of forming stations by intermittently rotating the first machine section; opening a closed lower end of a glass tube by means of a vertical flame jet directed upwardly provided by a vertical burner nozzle stationary mounted on the stationary machine frame at an opening station; forming a tip for a needle, at the lower end of the glass tube by means of continuously rotary forming rollers horizontally and rotary mounted on the stationary machine frame at a tip forming station; and cutting off a syringe body from the glass tube having the needle tip formed at its lower end, by means of a horizontal flame jet provided by a burner nozzle horizontally mounted on the stationary machine frame, at a cutting off station; then translating the syringe body having a needle tip formed at its lower end and an upper closed end, to a second machine section intermittently rotating to a plurality of stations: continuously rotary holding each syringe body by means of rotary gripping chucks equally and stationary mounted on the stationary machine frame; translating the syringe body to a plurality of forming and finishing stations by intermittently rotating the second machine section; opening the closed upper end of the syringe body, by means of a vertical flame jet directed downward provided by a vertical burner nozzle stationary mounted on the stationary machine frame at an opening station; forming a perpendicular flat finger flange at the opened upper end of the syringe body by means of a slanting flame jet provided by a slanting burner nozzle, slanting and stationary mounted on the stationary machine frame at a finger flange forming station; fire finishing the just formed finger flange by means of a burner nozzle horizontally and stationary mounted at the stationary machine frame at a fire finishing station; and finally discharging the syringe body at a discharging station.

The above disclosed method has to be carried out in the intermittently rotary type forming machine having a tooling specifically invented to carry out this method, as disclosed in connection with the method.

In these way, the syringe body can be produced continuously from a plurality of automatically fed long glass tubes, in a single forming cycle in an intermittently and horizontally rotary type forming machine, at a high velocity of production.

SUMMARY OF THE INVENTION

It is therefore a main objective of the present invention, to provide an intermittently horizontally-rotary forming machine for the manufacturing of syringe bodies form vertically fed long glass tubes in a single continuous forming cycle.

It is also a main objective of the present invention, to provide an intermittently horizontally-rotary forming machine for the manufacturing of syringe bodies, of the above disclosed nature including two machine forming sections, a first machine section for forming a tip at a lower end of a glass tube and cutting off a syringe body therefrom, and a second machine section for forming a finger flange at an upper closed end of a just formed syringe body including the tip for a needle.

It is still a main objective of the present invention, to provide an intermittently horizontally-rotary forming machine for the manufacturing of syringe bodies, of the above disclosed nature, including a plurality of heating and softening burners and a plurality of forming mechanisms, respectively mounted on a stationary machine frame of the first and second machine sections, for forming the needle tip portion at the lower end of a glass tube, cutting off a syringe body from the glass tube and forming the finger flange at an upper end of the syringe body.

It is an additional main abject of the present invention, to provide a method for the manufacturing of syringes by vertically feeding long glass tubes to an intermittently horizontally-rotary forming machine including two forming sections.

It is also a main abject of the present invention, to provide a method for the manufacturing of syringes, of the above mentioned nature, by firstly forming a tip portion at a lower end of the glass tube, at a first machine section, cutting off a syringe body including the needle tip portion at its lower end and then opening an upper end of the syringe body and forming a finger flange at the upper end of the syringe body.

These and other objects and advantages of the present invention will be apparent to those persons having ordinary skill in the art from the following detailed description of the invention.

BRIEF DESCRIPTION OF THE DRAWINGS

FIG. 1, is an exploded lateral view of a typically known glass syringe manufactured in accordance with the method and a machine of the present invention.

FIG. 3b is the machine of FIG. 3a in a double configuration of the first machine section, for feeding a second machine section at each side of the double configuration of the fist machine section;

DETAILED DESCRIPTION OF THE INVENTION

Figure 2A:
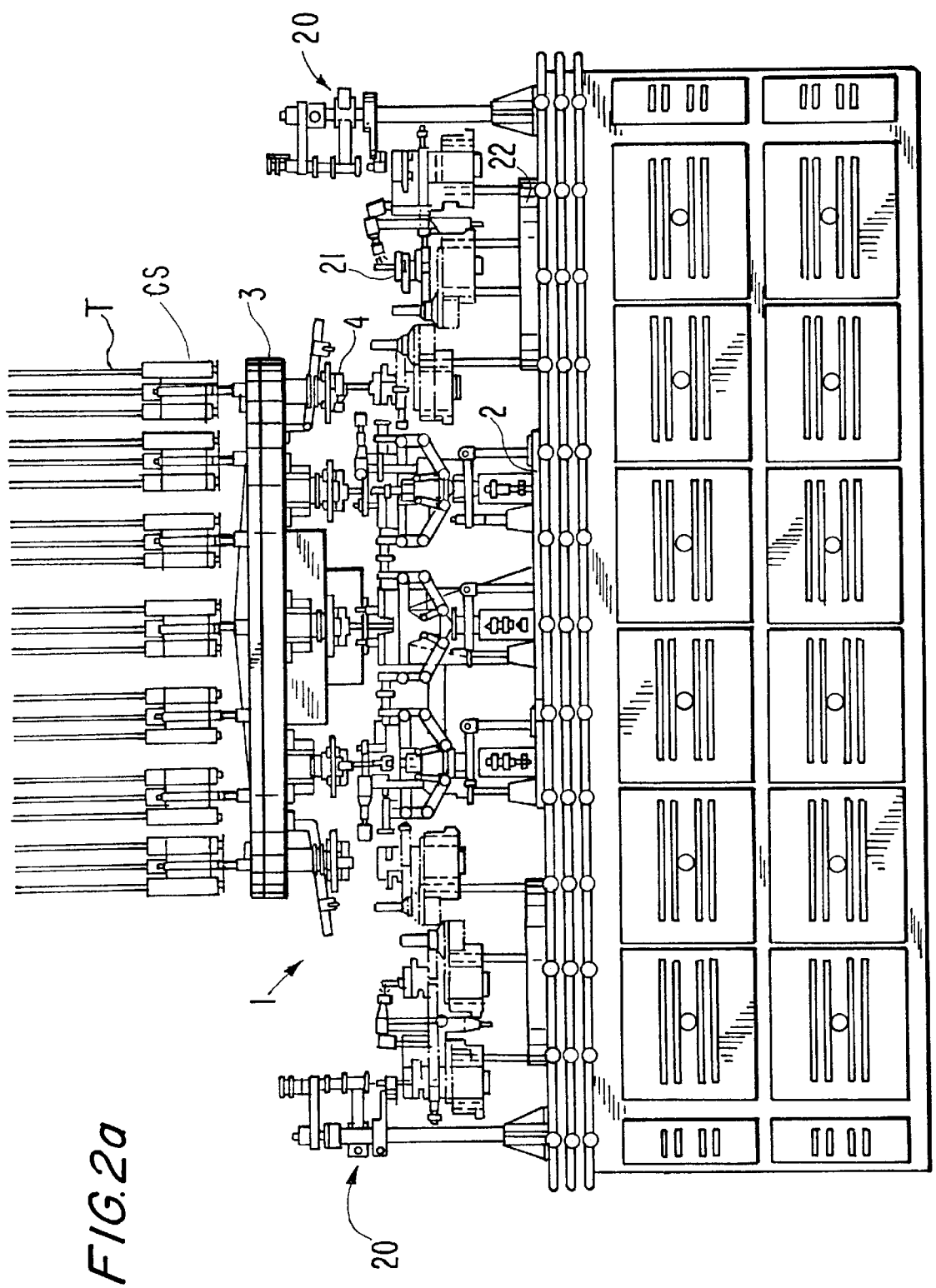
FIG. 2a is an elevation view of the machine for the manufacturing of syringes, in accordance with the present invention.
Figure 2B:
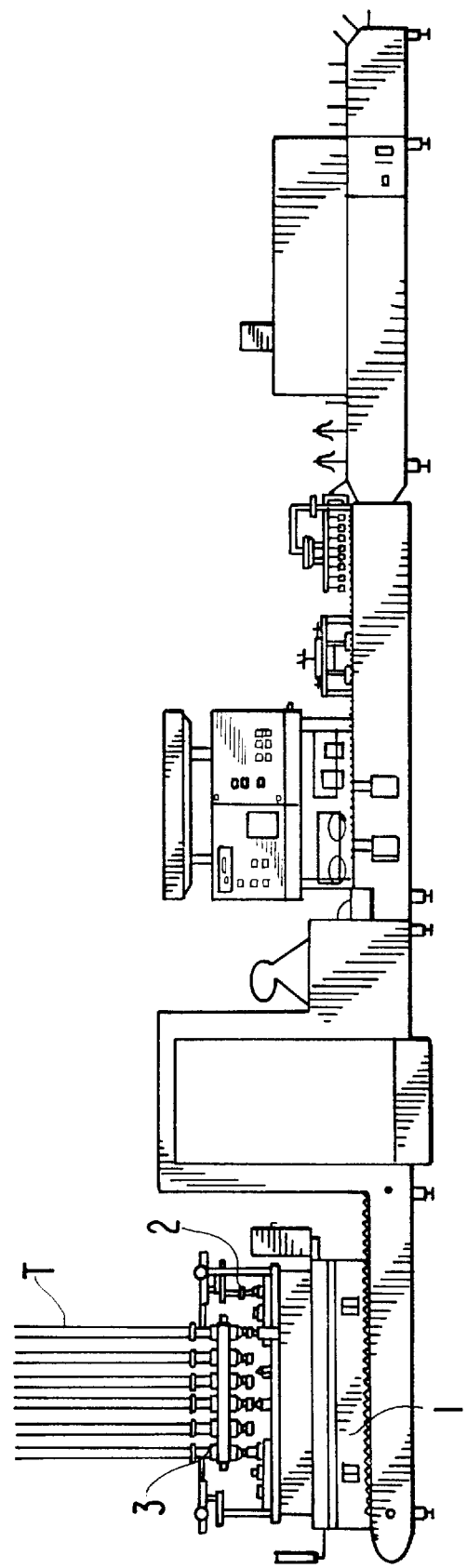
FIG. 2b, is a lateral schematic view of the machine of FIG. 2a, in a whole line of production.

Referring to FIG. 1 of the accompanying drawings, a conventional glass syringe body normally comprises a cylindrical syringe body SB including a tip NT for a needle and a finger flange FF; a steel needle N having a plastic flared end FE to be inserted by pressure at the needle tip NT of the syringe body SB; a stem S having a gum plunger P at its rear end and a top flat end TE which is normally introduced into the tubular syringe body, to complete the syringe. The steel needle N and the stem S are not a part of the invention.

For a better understanding of the present invention, it will be firstly described the forming machine of the present invention and then will be described the method of the present invention carried out in said forming machine.

The rotary machine for the manufacturing of syringes, of the present invention, as illustrated in FIGS. 2 to 7, produces only the syringe bodies SB including the tip NT and the finger flange FF, from a plurality of large glass tubes T. Each syringe body SB is cutoff by a flame jet provided by a burner nozzle, from a glass tube T and consequently the upper cutoff end UEB of the syringe body and of the lower end LET of the tube T, are both closed and both have to be opened by a flame jet.

Referring to FIGS. 2a, 2b, 3a, 3b and 4a to 4v, the intermittently and horizontally rotary machine for the manufacturing of syringes bodies, in accordance with an specific and preferred embodiment of the present invention, comprising:

a first machine section 1 for forming firstly the tip NT for a needle at the closed lower end LET of a glass tube T which is finally cutoff forming the syringe body SB including the tip NT at its lower end, and a second machine section 20 for forming the syringe finger flange FF at the upper end UEB of the syringe body SB, each section having a plurality of forming stations;

the first machine section 1 starts a tip and body forming cycle once a previously formed syringe body SB has been cutoff from the long glass tube T and transferred to the second section 20 and the second section 20 starts its finger flange and finishing forming cycle once the syringe body SB having the formed tip NT has been cutoff and received and finish its cycle once the finger flange has been finished and the syringe body SB is delivered to a carrier conveyor;

the first machine section 1, having:
a stationary machine frame 2:
a rotary machine frame 3, intermittently and horizontally rotating on a vertical axes of a rotary motor (not illustrated) centrally mounted at the stationary machine frame 2, to a plurality of forming stations;
a plurality of tube carrying sleeves CS, each equally distributed on the rotary frame 3 for vertically carrying a glass tube T;
a plurality of continuously rotary chucks 4 (such as a mandrel having a plurality of opening and closing fingers), each equally distributed around the rotary machine frame 3, under the tube carrying sleeves CS, and including an opening and closing mechanism (not illustrated) to be opened for receiving a glass tube T and closed to hold said glass tube T, and is mounted on a rotary drive mechanism (not illustrated) to be continuously and horizontally rotated;

a first vertical burner nozzle 5 (FIG. 5c) vertically and stationary mounted at the stationary machine frame 2 at a first station S1, which opens the closed lower end LET of the glass tube T by means of an upwardly directed vertical flame jet provided by the vertical burner nozzle 5;

a first horizontal burner nozzle 6 (FIG. 4d) horizontally and stationary mounted at the stationary machine frame 2 at a second station S2, for heating and softening the lower end LET of the glass tube T;

a pair of rotary neck forming rollers 7, 7' (FIG. 4e), each horizontally and rotary mounted at the stationary machine frame 2 at a third station S3, each rotating on a vertical axes and mounted on a laterally oscillating mechanism OM1 which will be described below, and which oscillates to the lower end LET of the glass tube T from a distal end, to form a neck portion N, as a preparation for a tip NT for a needle, and afterwards to said distal end once the neck portion N has been formed;

a second horizontal burner nozzle 8 (FIG. 4f) horizontally and stationary mounted at the stationary machine frame 2 at a fourth station S4, for fire finishing the neck portion N at the lower end LET of the glass tube T;

a third horizontal burner nozzle 9 (FIG. 4g) horizontally and stationary mounted in the stationary machine frame 2 at a fifth station S5, for heating and softening the neck portion N;

a pair of rotary tip-forming rollers 10, 10' (FIG. 4h), each horizontally and rotary mounted on the stationary machine frame 2 at a sixth station S6, each rotating on a vertical axis and is mounted on a laterally oscillating mechanism OM2 which will be described below, and which oscillates to the neck portion N at the lower end LET of the glass tube T, from a distal end, to form the tip NT for a needle, and afterwards to said distal end once the tip NT has been formed;

a fourth horizontal burner 11 (FIG. 4i) horizontally and stationary at the stationary machine frame 2 at a seventh station S7, for heating and softening the just formed needle tip NT;

a tip finishing mechanism 12 (FIG. 4j) vertically mounted at the stationary machine frame 2 at an eight station S8, including a lifting and lowering mechanism 13, for vertically lifting and introducing a punching needle 14 at a vertical orifice of the tip NT at the lower end LET of the glass tube T, finishing the tip NT, and lowering said punching needle 14 once the tip NT has been finished;

a fifth horizontal burner nozzle 15 (FIG. 4k) horizontally and stationary mounted at the stationary machine frame 2 at a ninth station S9, for fire finishing the tip NT;

a support plate 16 (FIG. 4m) mounted at the stationary machine frame 2 at a tenth station S10, mounted on a lifting and lowering mechanism (not illustrated) for receiving and lowering the glass tube T having the tip NT formed at its lower end LET, momentarily released by the chuck 4, at said tenth station S10, at a distance corresponding to the length of the syringe body SB, which is afterwards held again by the continuously rotary chuck 4;

a sixth horizontal burner nozzle 18 (FIG. 4n) horizontally and stationary mounted at the stationary machine frame 2 at an eleventh station S11, for heating and softening the glass tube T at a zone wherein a syringe body SB including the just formed tip NT, will be cutoff; and a seventh horizontal burner nozzle 19 (FIG. 4o) horizontally and stationary mounted at the stationary machine frame 2 at a twelve station S12, for cutting off the syringe body SB from the tube T, by means of a horizontal flame jet provided by the horizontal burner nozzle 19, consequently closing a lower end LET of the glass tube T retained by the chuck 4, and the upper end UEB of the just formed syringe body SB which is held by a chuck 23 of the second section 20, as will be described in the following, which lowers said syringe body SB for a short run; and a second machine section 20 intermittently and horizontally rotating to a plurality of stations and having:

a stationary machine frame 21;

a rotary machine frame 22 intermittently and horizontally rotating on a vertical axis of a rotary motor (not illustrated) centrally mounted at the stationary machine frame 21, to a plurality of forming stations;

a plurality of continuously rotary chucks 23 (FIG. 4o), equally distributed around the horizontally rotary frame 21, each chuck 23 including an opening and closing mechanism to be opened for receiving a syringe body SB and closed to retain said syringe body SB, a rotating mechanism, to rotate on a vertical axis and is mounted on a lifting and lowering mechanism (not illustrated), on the rotary machine frame 22, adapted to be vertically lifted to receive and hold a just cut syringe body SB at a first station SS1 when it is delivered by the chuck 4 of the first section 1 at the twelfth station S12, and lowering it at a forming level;

a first horizontal burner nozzle 25 (FIG. 4p) horizontally and stationary mounted on the stationary machine frame 21 at a second station SS2, for heating and softening the closed upper end CUE of the syringe body SB;

a first vertical burner nozzle 26 (FIG. 4q) vertically and stationary mounted on the stationary machine frame 21 at a third station SS3, which opens the closed upper end CUE of the syringe body SB by means of an downward directed vertical flame jet provided by the vertical burner nozzle 26;

a second horizontal burner nozzle 27 (FIG. 4r) horizontally and stationary mounted on the stationary machine frame 21, for heating and softening the opened upper end UEB of the syringe body SB, at a fourth station SS4;

a first slanting burner nozzle 28 (FIG. 4s), slanting and stationary placed at the stationary machine frame 21 at a fifth station SS5, directing a slanting flame jet to an internal edge of the upper opened end UEB of the syringe body SB to form a perpendicular flat finger flange FF at the upper end UEB of the syringe body SB;

a second slanting burner nozzle 29 (FIG. 4t) horizontally and stationary mounted at the stationary machine frame 21, for fire finishing the just formed finger flange FF, at a sixth station SS6;

a discharging evacuation cone 30 (FIG. 4v) stationary placed at the stationary machine frame 21 at a seventh station SS7, at which the chuck 23 opens (FIG. 4u) releasing the just formed syringe body SB which is discharged to said evacuation cone 30 to be conducted to a conveyor belt; and a preparing station at an eight station SS8 (FIGS. 3a and 3b) for preparing the chuck 23 to initiate another forming cycle.

Figure 5:
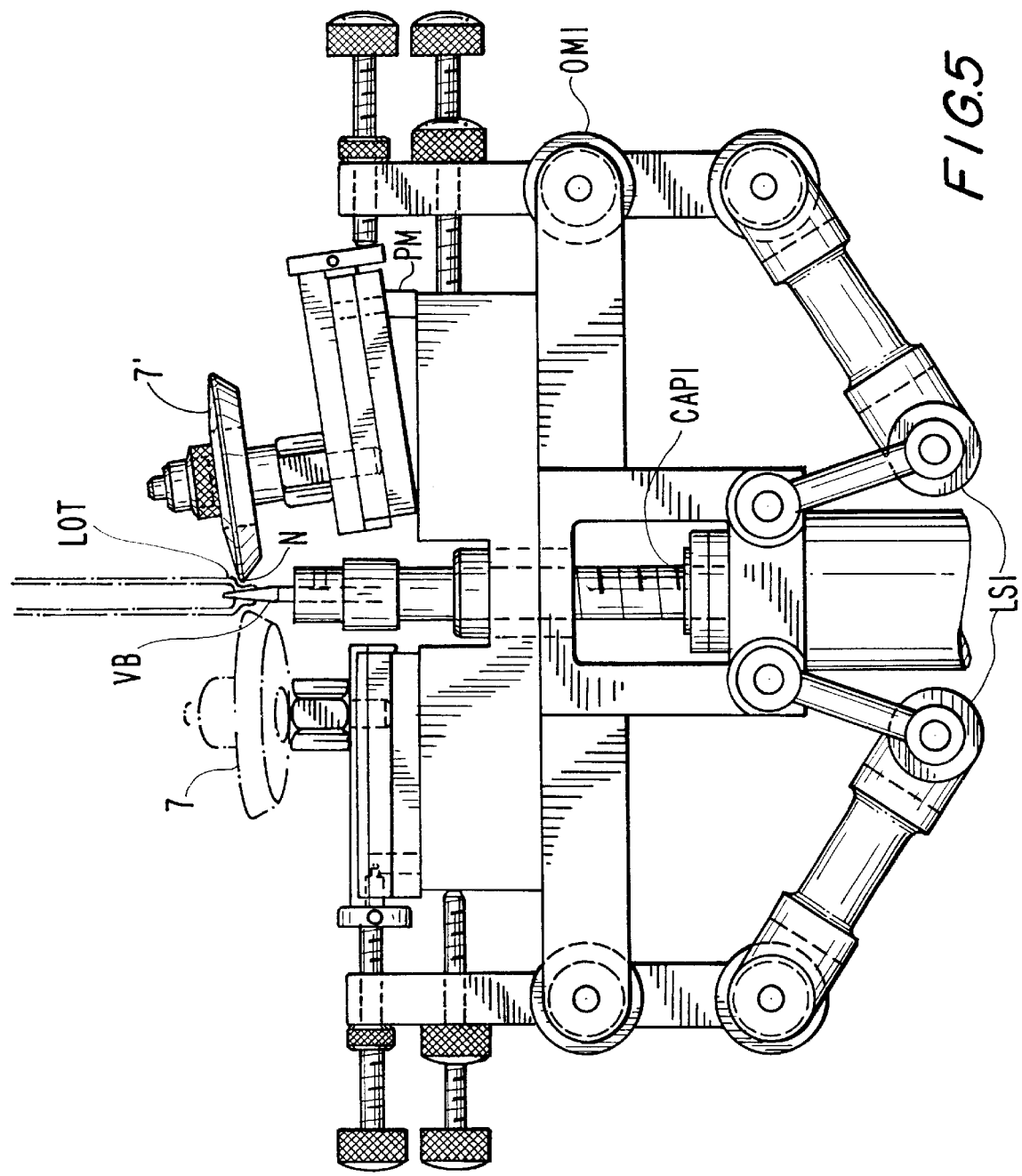
FIG. 5, is a frontal elevation view of a neck portion forming tool of the first machine section, in accordance with the machine for the manufacturing of syringes of the present invention.

The laterally oscillating mechanism OM1 to oscillate the neck forming rollers 7,7', to the lower end LET of the glass tube T from a distal end, to form the neck portion N and afterwards to said distal end, can be of any suitable type, such as that illustrated in FIG. 5, which is of the type including a linkage system LS1 actuated by means of a cylinder and piston assembly CPA1 to a first position, to move the neck forming rollers 7, 7' to the lower end LET of the glass tube T, and then to a second position, to turn the neck forming rollers 7,7' to the distal end. It is convenient that one of the rollers 7' may be progressively tilted downstream by a pushing member PM actuated by said cylinder and piston assembly CPA1. Furthermore, a vertical burner VB1 can be provided between the rollers 7, 7', in order to provide a thin flame jet which is introduced through the lower opened end LET of the glass tube T, to guarantee that the opened passage be maintained into the neck N.

Figure 6:
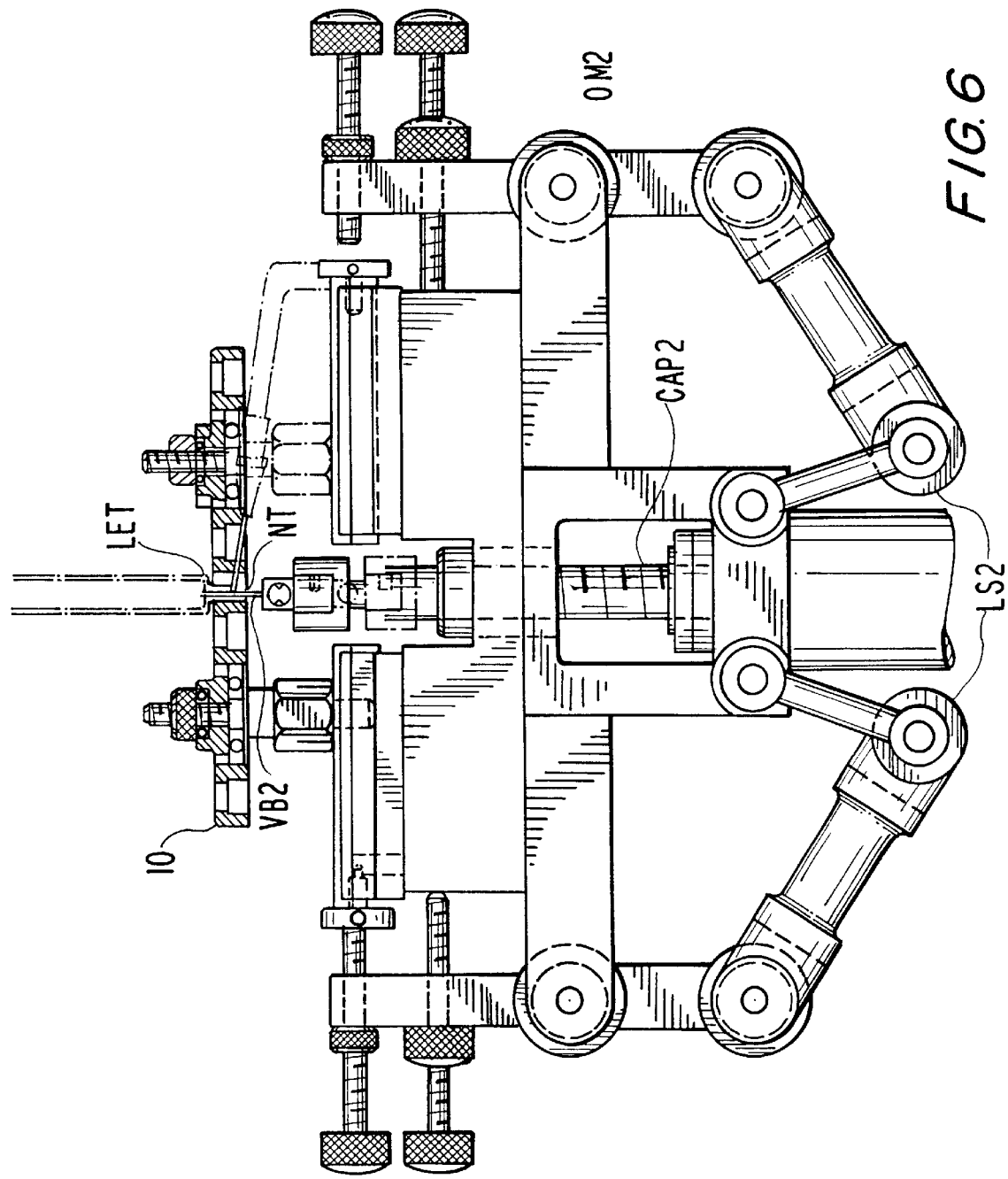
FIG. 6, is a frontal elevation view of the needle tip forming tool of the first machine section, in accordance with the machine for the manufacturing of syringes of the present invention.

The laterally oscillating mechanism OM2 to oscillate the tip-forming rollers 10, 10' to the neck portion N at the lower end LET of the glass tube T from a distal end, to form the tip NT for a needle and afterwards to said distal end, illustrated in FIG. 6, is similar to the mechanism OM1, except for the pushing member PM, and may include a linkage system LS2 actuated by means of a cylinder and piston assembly CPA2 to a first position, to move the tip-forming rollers 10, 10' to the neck N of the lower end LET of the glass tube T, and then to a second position, to turn the tip-forming rollers 10, 10' to the distal end. In this case, a vertical burner VB2 can be provided between the rollers 10, 10', in order to provide a thin flame jet which is introduced through the top NT at the lower opened end LET of the glass tube T, to guarantee that the opened passage be maintained into the tip NT. As well as a slanting burner SB under one of the tip-forming rollers 10', to provide a thin flame jet for conditioning the tip forming operation.

In the step of opening the closed lower end LEB of the syringe body SB by means of a vertical flame jet provided by the vertical burner nozzle 8, it is convenient to additionally include an horizontal burner 8' to avoid flaring or deformation of said lower end of the body LEB.

Figure 7:
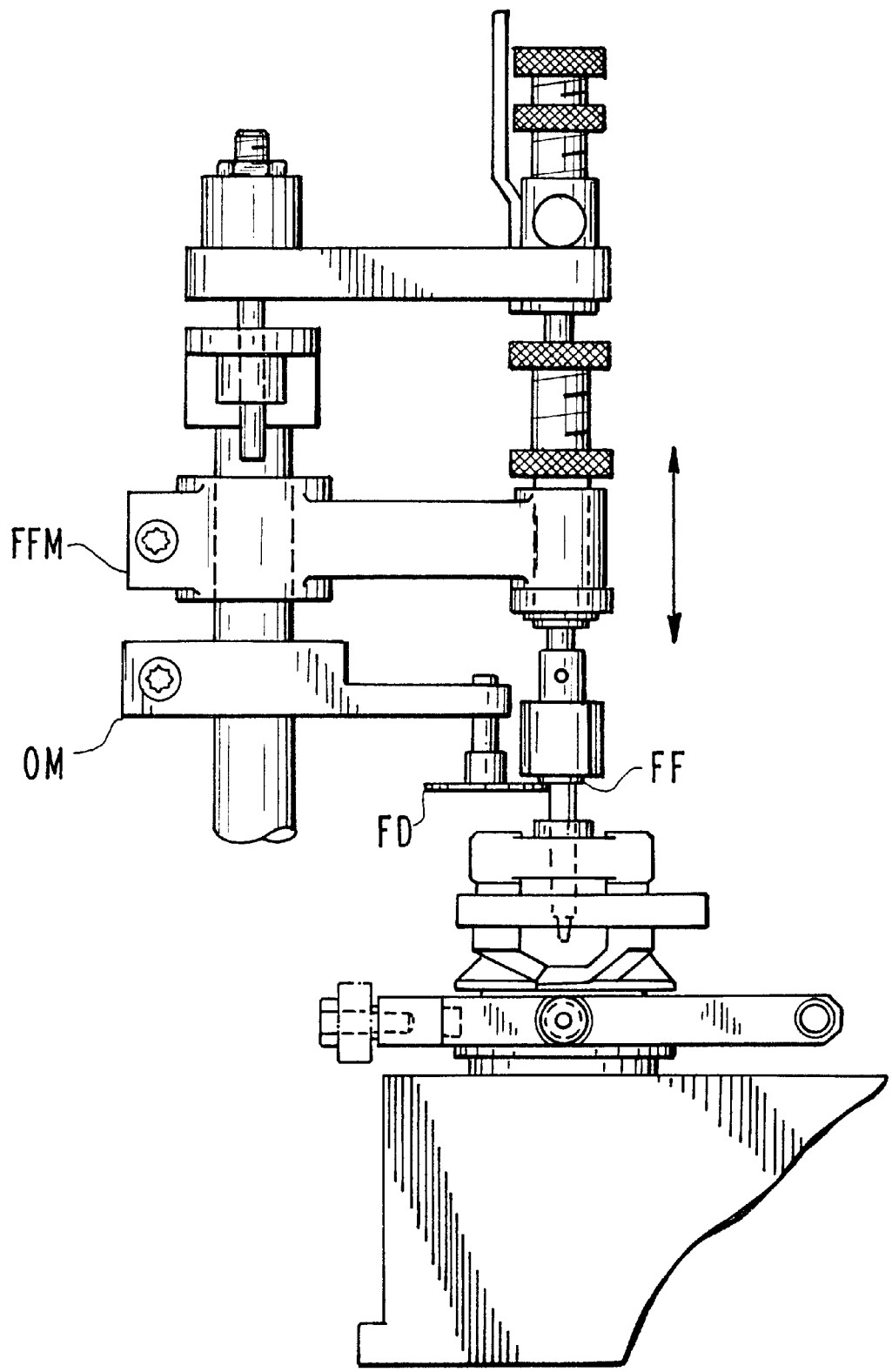
FIG. 7, is a frontal elevation view of the needle tip finishing tool of the first machine section, in accordance with the machine for the manufacturing of syringes of the present invention.

Similarly, some conditioning stations can be introduced, to prepare and heat conditioning the syringe body SB for a following station, for example, as illustrated in FIG. 7, at the sixth station SS6, a mechanism FFM can be provided, in addition to the horizontal burner nozzle 29 for fire finishing the just formed finger flange FF, to properly shape the finger flange. Such mechanism FFM may include an oscillating member OM to introduce a forming disk FD under the just formed finger flange, in order that, while the burner nozzle is fire finishing the finger flange FF, this could be properly flattened and shaped by the disk FD which afterwards is oscillated out of coincidence with the finger flange FF.

Or else, some of the heating and softening steps can be eliminated if, for example the intensity of the flame and/or the forming time are increased. Additionally, the neck portion forming step could be avoided depending on the time and intensity of the flame jet or of efficient tip forming tool is introduced.

It is a good practice, to include one or more additional sets of carrier sleeves placed in rows or circularly to each of the rotary chucks, for automatically feeding glass tubes when the length of a previous glass tube has been finished.

Furthermore, it is also a good practice that the first machine section be equipped with a double amount of stations, to deliver a syringe body SB having its needle tip NP already formed, to a pair of second machine sections 16,16', each placed at each side of the first machine section 1, both second machine sections delivering the finished syringe body including its tip NT and its finger flange FF to a same carrier conveyor 22 leading the finished syringe bodies SB to an inspection station, a re-heating station and to a packing station which are not a part of this machine.

Figure 3A:
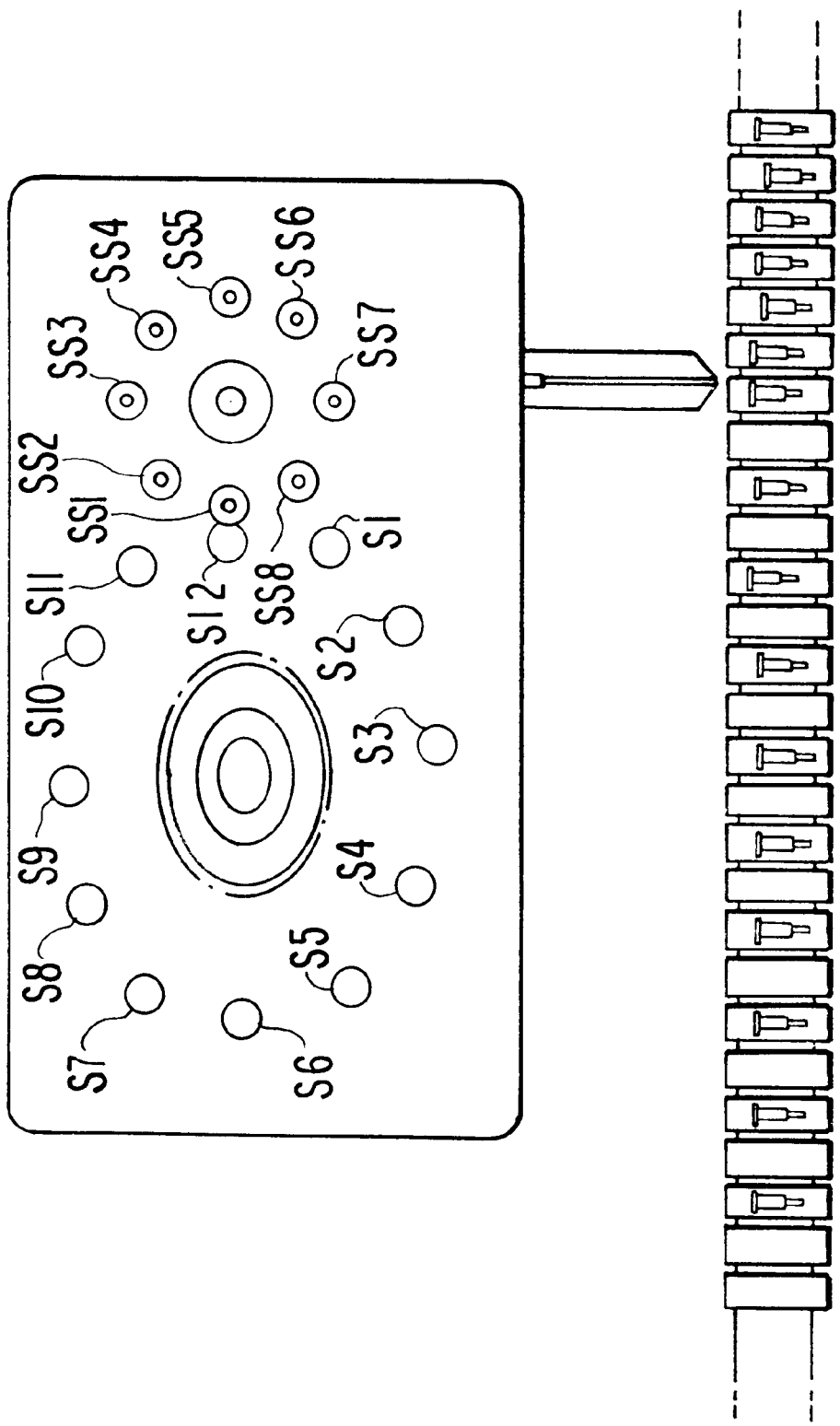
FIG. 3a, is a schematic plan view of the machine for the manufacturing of syringes, in accordance with the present invention, in a single configuration
Figure 4N:
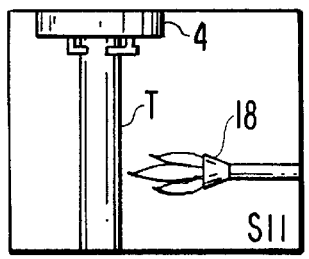
FIGS. 4a to 4v are a series of drawings representing the sequence of steps and components intervening in a syringe body forming cycle at the machine of FIG. 2.
Figure 4O:
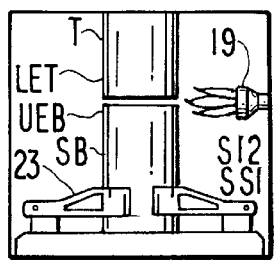
Figure 4P:
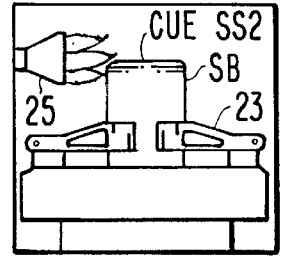
Figure 4Q:
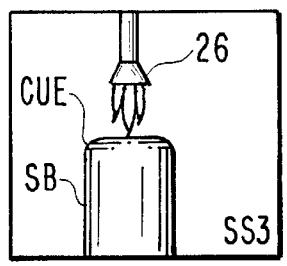
Figure 4R:
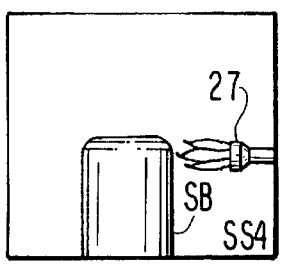
Figure 4S:
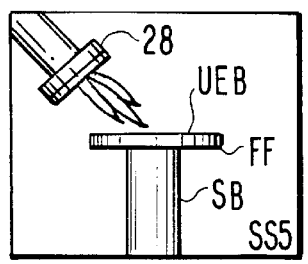
Figure 4T:
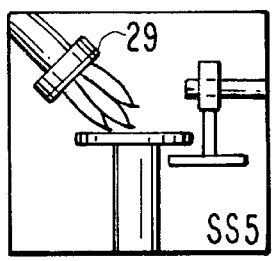
Figure 4U:
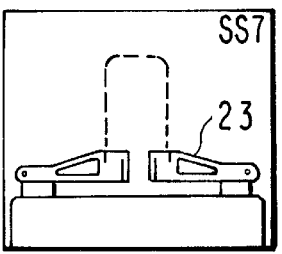
Figure 4V:
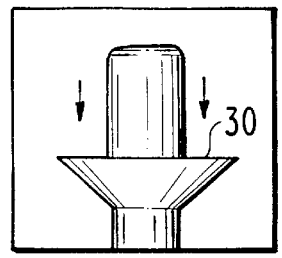

As to the method for the manufacturing of syringes, in the above disclosed vertical machine, in a specific embodiment thereof, in accordance with the present invention, this comprising:

vertically placing a plurality of long glass tubes T in a first machine section 1 of the intermittently horizontally rotary machine, (FIG. 4a) intermittently rotating to a plurality of stations, mounted on a central axis of a stationary machine frame 2;

continuously rotary holding each tube T by rotary carrying sleeve CS stationary mounted on the stationary machine frame;

translating a tube T to an opening station S1 (FIG. 4c) by intermittently rotating the first machine section 1;

opening a closed lower end LET of the glass tube T by means of a vertical flame jet directed upwardly provided by a vertical burner nozzle 5 stationary mounted on the stationary machine frame 2 at the opening station S1 (FIG. 4c);

translating the glass tube T having its opened lower end LET, to a heating and softening station S2 (FIG. 4d) by intermittently rotating the first machine section 1;

heating and softening the lower end LET of the glass tube T by means of a horizontal flame provided by a burner nozzle 6 horizontally mounted at the stationary machine frame 2, at the heating and softening station S2 (FIG. 4d);

translating the glass tube T having its opened lower end LET, to a neck forming station S3 by intermittently rotating the first machine section 1;

forming a neck portion N at the lower end LET of the glass tube T by rotary neck forming rollers 7,7' horizontally and rotary mounted on the stationary machine frame 2, at the neck forming station S3 (FIG. 4e);

translating the glass tube T having its opened lower end LET, to a fire finishing station S4 (FIG. 4f) by intermittently rotating the first machine section 1;

fire finishing the neck portion N of the glass tube T by means of a horizontal flame provided by a burner nozzle 8 horizontally mounted at the stationary machine frame 2, at the fire finishing station S4 (FIG. 4f);

translating the glass tube T having the neck portion N at its lower end LET, to a heating and softening station S5 (FIG. 4g) by intermittently rotating the first machine section 1;

heating and softening the neck portion N of the glass tube T by means of a horizontal flame provided by a burner nozzle 9 horizontally mounted at the stationary machine frame 2, at the heating and softening station S5 (FIG. 4g);

translating the glass tube T having a neck portion N at it lower end LET, to a tip forming station S6 (FIG. 4h) by intermittently rotating the first machine section 1;

forming a tip NT for a needle, at the neck portion N of the lower end LET of the glass tube T by means of rotary tip forming rollers 10,10 horizontally and rotary mounted on the stationary machine frame 2 at said tip forming station S6 (FIG. 4h);

translating the glass tube T having the tip NT at its lower end LET, to a heating and softening station S7 (FIG. 4i) by intermittently rotating the first machine section 1;

heating and softening the tip NT of the glass tube T by means of a horizontal flame provided by a burner nozzle 11 horizontally mounted at the stationary machine frame 2, at the heating and softening station S7 (FIG. 4i);

translation the glass tube T having the tip N ant its lower end LET, to a tip finishing station S8 (FIG. 4j);

finishing the tip NT at the lower end LET of the glass tube T, by means of a tip finishing mechanism 12 mounted at the stationary machine frame 2 at said tip finishing station S8, by introducing a punching needle 14 at a vertical orifice of the tip NT (FIG. 4j);

translating the glass tube T having its finished tip at its lower end LET, to a fire finishing station S9 (FIG. 4k) by intermittently rotating the first machine section 1;

fire finishing the tip NT at the lower end LET of the glass tube T by means of a horizontal flame provided by a burner nozzle 17 horizontally mounted at the stationary machine frame 2, at the fire finishing station S9 (FIG. 4k);

translating the glass tube T having its finished tip NT at its lower end LET, to a dimensioning station S10 (FIG. 4m) by intermittently rotating the first machine section 1;

releasing the glass tube T having its finished tip NT by momentarily opening the chuck 4, and receiving the glass tube T by means of a plate 16 which lowers the glass tube T at a distance corresponding to the length of the syringe body SB, which is afterwards held again by the chuck 4, at said dimensioning station S10 (FIG. 4m);

translating the glass tube T, to a heating and softening station S11 (FIG. 4n) by intermittently rotating the first machine section 1;

heating and softening the lower end LET of the glass tube T by means of a horizontal flame provided by a burner nozzle 18 horizontally mounted at the stationary machine frame 2, at the heating and softening station S11, at a zone wherein a syringe body SB including the tip NT, will be cutoff (FIG. 4n);

translating the glass tube T having the tip NT formed at its lower end LET, to a cutting off station 12 (FIG. 4o);

cutting off a syringe body SB from the glass tube having the tip NT formed at its lower end LEB, by means of a horizontal flame jet provided by burning nozzle 19 horizontally mounted on the stationary machine frame 2, at said cutting off station S12 (FIG. 4o);

translating the syringe body SB having a tip NT at its lower end LEB and an upper closed end UEB, to a second machine section 20 of the intermittently horizontally rotary machine 1, intermittently rotating to a plurality of stations, mounted on a central axis of a stationary machine frame 21;

continuously rotary holding each syringe body SB by means of rotary gripping chuck 23 stationary mounted on the stationary machine frame 21, at a receiving station SS1 (FIG. 4o), translating the syringe body SB, to a heating and softening station SS2 (FIG. 4p) by intermittently rotating the second machine section 20;

heating and softening the closed upper end CUE of the syringe body SB by means of a horizontal flame provided by a burner nozzle 25 horizontally mounted at the stationary machine frame 21, at the heating and softening station SS2 (FIG. 4p);

translating the syringe body SB to an opening station SS3 (FIG. 4q) by intermittently rotating the second machine section 21;

opening the closed upper end CUE of the syringe body SB, by means of a vertical flame jet directed downward provided by a vertical burner nozzle 26 stationary mounted on the stationary machine frame 21 at the opening station SS3 (FIG. 4q);

translating the syringe body SB to a heating and softening station SS4 (FIG. 4r) by intermittently rotating the second machine section 21;

heating and softening the opened upper end UEB of the syringe body SB by means of a horizontal flame provided by a burner nozzle 27 horizontally mounted at the stationary machine frame 21, at the heating and softening station SS4 (FIG. 4r);

translating the syringe body SB to a finger flange forming station SS5 (FIG. 4s) by intermittently rotating the second machine section 21;

forming a perpendicular flat finger flange FF at the upper end UEB of the syringe body SB by means of a slanting flame jet provided by a slanting burner nozzle 28, slanting and stationary mounted on the stationary machine frame 21 at said finger flange forming station SS5 (FIG. 4s);

translating the syringe body SB to a fire finishing station SS6 (FIG. 4t) by intermittently rotating the second machine section 21;

fire finishing the just formed finger flange FF by means of a burner nozzle horizontally and stationary mounted at the stationary machine frame 21 at said fire finishing station SS6 (FIG. 4t);

translating the syringe body SB to a discharging station SS7 (FIGS. 4u and FIG. 4v) by intermittently rotating the second machine section 21;

discharging the finished syringe body SB at said discharging station SS7 (FIGS. 4u and FIG. 4v); and translating the chuck 23 to a conditioning station SS8 FIGS. 3a and 3b), by intermittently rotating the second machine section 21, for preparing the chuck 23 to initiate another forming cycle.

Again, some of the heating and softening steps and neck forming step can be eliminated if, for example the intensity of the flame is increased and if an efficient tip forming tool is introduced.

Therefore, it has to be understood that the invention is not limited just to the above disclosed specific embodiments thereof, and that the persons having ordinary skill in the art will be prepared, by the teachings of the present invention, to introduce changes in the type and distribution of the components and operation sequence thereof, which will be within the scope of the invention as claimed in the following claims:

What is claimed is:

1. An intermittently horizontally rotary machine for the manufacturing of syringes from a plurality of vertically fed glass tubes, comprising:

a first machine section, intermittently rotating to a plurality of forming stations, having:

a stationary machine frame;

a rotary machine frame, intermittently and horizontally rotating on vertical axis of a drive means which is mounted on the stationary machine frame, to a plurality of forming stations;

a plurality of continuously rotating glass tube gripping means, each mounted equidistantly about the carrying means, and continuously rotating on their respective vertical axes for receiving and vertically holding a vertically rotating glass tube;

a plurality of burner means, each stationary mounted around the stationary machine frame at a forming station, providing a flame jet for opening a closed lower end of a glass tube, for heating and softening a lower end of the glass tube, for fire finishing a needle tip portion at the lower end of the glass tube, and for cutting off a syringe body from the glass tube; and rotary tip forming means horizontally and rotary mounted on the stationary machine frame at a tip forming station, for forming a tip for receiving a needle, at the lower end of the glass tube; and a second machine section intermitently and horizontally rotating to a plurality of stations and having:

a stationary machine frame a horizontally rotary machine frame intermittently and horizontally rotating on a vertical axis of drive means which are mounted on the stationary machine frame, to the plurality of forming stations a plurality of continuously rotating gripping means, each mounted equidistantly about the horizontally rotating machine frame and continuously rotating on their respective vertical axes for receiving and vertically holding a rotating syringe body, and releasing a finished syringe body;

a plurality of burner means, each stationary mounted around the stationary machine frame, at a forming station, for heating and softening an upper closed end of the syringe body, opening the upper closed end of the syringe body, forming a perpendicular flat finger flange at an opened upper end of the syringe body, and fire finishing a just formed finger flange.

2. The machine as claimed in claim 1, wherein the rotary machine frame includes a plurality of tube carrying means, each mounted equidistantly on the rotary machine frame for vertically carrying the glass tube.

3. The machine as claimed in claim 1, wherein each of the continuously rotating gripping means of the first machine section includes a plurality of opening and closing gripping fingers to hold and release a rotating glass tube.

4. The machine as claimed in claim 1, comprising burner means at a first station, vertically mounted at the stationary machine frame of the first machine section, directing a flame jet upwardly to the closed lower end of a glass tube held by the gripping means, to open said closed end at said first station.

5. The machine as claimed in claim 1, comprising burner means at a second station, horizontally mounted at the stationary machine frame of the first machine section, directing a flame jet horizontally to the lower end of a glass tube held by the gripping means, for heating and softening the lower end of the glass tube, preparing it to a neck formation at the third station.

6. The machine as claimed in claim 1, wherein the rotary tip forming means comprises rotary neck forming means, stationarily mounted on the stationary machine frame at a neck forming station, for forming a neck portion at a lower end of the glass tube and preparing it for a tip forming station.

7. The machine as claimed in claim 1, wherein the rotary neck forming means comprises a pair of rotary neck forming disks horizontally and rotary mounted in the stationary machine frame at a third station, each of said disks being mounted for rotation on vertical axes and on a laterally oscillating mechanism which oscillates the glass tube from a distal end, to form a neck portion at the lower end of the glass tube and afterwards to said distal end once the neck portion has been formed as a perparation for a tip formation.

8. The machine as claimed in claim 1, wherein the burner means at a fourth station are mounted horizontally at the stationary machine frame of the first machine section, directing a flame jet horizontally to the lower end of a glass tube held by the gripping means, for fire finishing the neck portion of the lower end of the glass tube.

9. The machine as claimed in claim 1, wherein the burner means at a fifth station are mounted horizontally at the stationary machine frame of the first machine section, directing a flame jet horizontally to the lower end of a glass tube held by the gripping means, for heating and softening the neck portion at the lower end of the glass tube, preparing for a tip forming station.

10. The machine as claimed in claim 1, wherein the rotary needle tip forming means comprising a pair of tip forming disks horizontally and rotary mounted in the stationary machine frame at a sixth station, each of said disks being rotary mounted on a vertical axes and on a laterally oscillating mechanism which oscillates to the neck portion of the lower end of the glass tube from a distal end, to form a tip for a needle at the lower end of the glass tube and afterwards to said distal end once the tip has been formed.

11. The machine as claimed in claim 1, wherein the burner means at a seventh station are mounted horizontally at the stationary machine frame of the first machine section, directing a flame jet horizontally to the tip of a glass tube held by the gripping means, for heating and softening the tip, preparing it for a tip finishing station.

12. The machine as claimed in claim 1, wherein the tip forming means include tip finishing means vertically mounted at the stationary machine frame at an eighth station, having a punching needle mounted on lifting and lowering means, for vertically lifting and introducing the punching needle into a vertical orifice at the tip of the lower end of the glass tube, finishing the tip, and lowering said punching needle once the tip has been finished.

13. The machine as claimed in claim 1, wherein the burner means at a ninth station are mounted horizontally at the stationary machine frame of the first machine section, directing a flame jet horizontally to a finished tip at the lower end of a glass tube held by the gripping means, for fire finishing the tip.

14. The machine as claimed in claim 1, wherein the burner means at a eleventh station are mounted horizontally at the stationary machine frame of the first machine section, directing a flame jet horizontally for heating and softening the glass tube at a height wherein a syringe body including the just formed tip, is to be cutoff from the glass tube.

15. The machine as claimed in claim 1, wherein the burner means at a twelfth station are mounted horizontally at the stationary machine frame of the first machine section, directing a flame jet horizontally for cutting off a syringe body, including the tip, from the glass tube.

16. The machine as claimed in claim 1, further comprising stopping means mounted at a tenth station on the stationary machine frame of the first machine section, for stopping a glass tube including a tip formed at a lower end, momentarily released by one of the continuously rotating gripping means, to fall at a distance equivalent to a length of the syringe body, which is afterwards held again by the continuously rotary gripping means.

17. The machine as claimed in claim 1, further comprising stopping means mounted at a tenth station on the stationary machine frame of the first machine section, including lifting and lowering means for receiving and lowering a glass tube having the tip formed at a lower end, momentarily released by the gripping means, at said tenth station, at a distance corresponding to the length of a syringe body, which is afterwards held again by the continuously rotary gripping means.

18. The machine as claimed in claim 1, wherein each of the continuously rotary gripping means of the second machine section including a plurality of opening and closing gripping fingers to rotary hold and release a syringe body.

19. The machine as claimed in claim 1, wherein each of the continuously rotary gripping means of the second machine section including lifting and lowering means, for vertically lifting the rotary gripping means to receive and hold a just cutoff syringe body when it is cutoff from the lower end of the glass tube and lowering the syringe body at a forming level.

20. The machine as claimed in claim 1, wherein the burner means at a second station of the second machine section are horizontally and stationary mounted at the stationary machine frame, for heating and softening a closed upper end of the syringe body at said second station.

21. The machine as claimed in claim 1, wherein the burner means at a third station of the second machine section are mounted vertically at the stationary machine frame of the second machine section, directing a flame jet downward to the closed upper end of a syringe body held by the gripping means, to open said closed upper end at said third station.

22. The machine as claimed in claim 1, wherein the burner means at a fourth station of the second machine section are horizontally and stationary mounted at the stationary machine frame of the second machine section, for heating and softening the opened upper end of a syringe body.

23. The machine as claimed in claim 1, wherein the burner means at a fifth station of the second machine section are slanting and stationary mounted on the stationary machine frame of the second machine section, directing an slanting flame jet at an internal edge of an upper end of an opened syringe body, to form a perpendicular flat finger flange at said opened upper end of the syringe body.

24. The machine as claimed in claim 1, wherein the burner means at a sixth station of the second machine section are horizontally and stationary mounted at the stationary machine frame, for fire finishing a just formed finger flange at said sixth station.

25. The machine as claimed in claim 1, including discharging means at a seventh station of the second machine section, include a discharging evacuation cone stationary placed at the stationary machine frame of the second machine section, at which the syringe body gripping means are opened releasing the just formed syringe body which is discharged to said evacuation cone to be conducted to a conveyor belt.

26. The machine as claimed in claim 1, wherein the syringe body gripping means are prepared at an eighth station, for beginning a new forming cycle.

27. The machine as claimed in claim 1, comprising a first machine section includes a first set of forming stations continuously followed by a second set of forming stations distributed at said stationary machine frame, and a pair of second machine sections, each placed laterally to the first machine section and including a set of forming stations, whereby the first set of forming stations of the first machine section deliver the syringe bodies to a lateral one of the second machine section and the second set of forming stations deliver the syringe bodies to a second one of the second machine sections, to be finished therein.

28. An intermittently horizontally rotary machine for the manufacturing of syringes from a plurality of glass tubes, comprising:
  a first machine section, intermittently rotating to a plurality of forming stations, having:
    a stationary machine frame;
    a rotary machine frame, intermittently and horizontally rotating on a vertical axis of a rotary motor mounted on the stationary machine frame, to a plurality of forming stations;
    a plurality of tube carrying means, each mounted equidistantly on the rotary machine frame for vertically carrying a glass tube;
    a plurality of continuously rotating chucks mounted equidistantly about the stationary machine frame, each chuck including an opening and closing mechanism to be opened for receiving a glass tube and closed to hold the tube, and a rotary mechanism to continuously rotate it on a vertical axis;
    a first vertical burner nozzle vertically and stationary placed at the stationary machine frame at a first station, which opens a closed lower end of the glass tube by means of a vertical flame jet directed upwardly, provided by the vertical burner nozzle;
    a first horizontal burner nozzle horizontally and stationary placed at the stationary machine frame at a second station, for heating and softening the lower end of the glass tube;
    a pair of rotary neck forming disks, each horizontally and rotary mounted on the stationary machine frame at a third station, each rotating on a vertical axis and mounted on a laterally oscillating mechanism which oscillates to the syringe body from a distal end, to form a neck portion, and afterwards to said distal end once the neck portion has been formed;
    a second horizontal burner nozzle horizontally and stationary placed at the stationary machine frame at a fourth station, for fire finishing the neck portion of the lower end of the glass tube;
    a third horizontal burner nozzle horizontally and stationary placed on the stationary machine frame at a fifth station, for heating and softening the neck portion;
    a pair of rotary tip-forming disks, each horizontally and rotary mounted on the stationary machine frame at sixth station, each rotating on a vertical axis and mounted on a laterally oscillating mechanism which oscillates the glass tube from a distal end, to form a needle tip portion, and afterwards to said distal end once the needle tip portion has been formed;
    a fourth horizontal burner horizontally and stationary placed at the stationary machine frame at a seventh station, for heating and softening the just formed needle tip;
    a needle tip finishing mechanism vertically mounted at the stationary machine frame at an eighth station, including a lifting and lowering mechanism, for vertically lifting and introducing a punching needle into a vertical orifice of the needle tip portion at the lower end of the glass tube, finishing the needle tip portion, and lowering said punching needle once the needle tip portion has been finished;

a fifth horizontal burner nozzle horizontally and stationary placed at the stationary machine frame at a ninth station, for fire finishing the needle tip portion;

a stopping support plate mounted at the stationary machine frame at a tenth station, mounted on a lifting and lowering mechanism for receiving and lowering the glass tube having the needle tip portion formed at its lower end, momentarily released by a chuck, at said tenth station, at a distance corresponding to the length of the syringe body, which is afterwards held again by the continuously rotary chuck;

a sixth horizontal burner nozzle horizontally and stationary placed at the stationary machine frame at an eleventh station, for heating and softening the glass tube at a zone wherein a syringe body including the just formed needle tip, is to be cutoff; and a seventh horizontal burner nozzle horizontally and stationary placed at the stationary machine frame at a twelfth station, for cutting off the syringe body from the glass tube, by means of a horizontal flame jet provided by the seventh horizontal burner nozzle, consequently closing a lower end of the tube retained by the chuck, and the upper end of the just formed syringe body; and a second machine section, intermittently rotating to a plurality of stations and having:

a stationary machine frame;

a horizontally rotary machine frame intermittently rotating on a vertical axis with respect to the stationary machine frame, to a plurality of forming stations;

a plurality of continuously rotating chucks, mounted equidistantly about the horizontally rotating frame, each chuck including an opening and closing mechanism to be opened for receiving a syringe body and closed to retain said syringe body, a rotating mechanism, to rotate on a vertical axis, and mounted on a lifting and lowering mechanism, on the rotary machine frame, adapted to be vertically lifted to receive and hold a just cut syringe body at a first station when it is delivered by a chuck of the first section at the twelfth station, and lowering it at a forming level;

a first horizontal burner nozzle, horizontally and stationary placed at the stationary machine frame at a second station, for heating and softening the closed upper end of the syringe body;

a first vertical burner nozzle vertically and stationary mounted on the stationary machine frame at a third station, for opening the closed upper end of the syringe body by means of a vertical flame jet directed downward, provided by the first vertical burner nozzle;

a second horizontal burner nozzle horizontally and stationary placed at the stationary machine frame, for heating and softening the opened upper end of the syringe body, at a fourth station;

a slanting burner nozzle, slanting and stationary placed at the stationary machine frame at a fifth station, directing and slanting flame jet to form a perpendicular flat finger flange at the upper end of the syringe body;

a third horizontal burner nozzle horizontally and stationary placed at the stationary machine frame, for fire finishing the just formed finger flange, at a sixth station;

a discharging evacuation cone stationary placed at the stationary machine frame at a seventh station, at which the chuck opens releasing the just formed syringe body which is discharged to said evacuation cone to be conducted to a conveyor belt; and a preparation station at an eighth station for preparing the chuck to initiate another forming cycle.

29. A method for the manufacturing of syringes from a plurality of glass tubes in an intermitently horizontally rotary machine including a first and a second intermittently horizontally rotary machine sections, comprising:

vertically placing a plurality of glass tubes in a first machine section of the intermittently horizontally rotary machine intermittently rotating to a plurality of stations, mounted on a central axis of stationary machine frame;

continuously holding each rotating tube by rotary gripping means stationary mounted on the stationary machine frame, transferring a tube to an opening station by intermittently rotating the first machine section;

opening a closed lower end of the glass tube by means of a vertical flame jet directed upwardly provided by vertical burner means stationary mounted on the stationary machine frame at the opening station;

transferring the glass tube having its opened end, to a tip forming station by intermittently rotating the first machine section;

forming a tip for a needle at the lower end of the glass tube by rotary tip forming means horizontally and rotationally mounted on the stationary machine frame at said tip forming station;

transferring the glass tube having a tip formed at its lower end, to a cutting off station;

cutting off a syringe body from the glass tube having the tip formed at its lower end, by means of a horizontal flame jet provided by burning means horizontally mounted on the stationary machine frame, at said cutting off station;

transferring the syringe body having a tip at its lower end and an upper closed end, to a second machine section intermittently rotating to a plurality of stations:

continuously holding each rotating syringe body by rotary gripping means stationary mounted on the stationary machine frame, transferring the syringe body to an opening station by intermittently rotating the second machine section;

opening the closed upper end of the syringe body, by means of a vertical flame jet directed downward provided by vertical burner means stationary mounted on the stationary machine frame at the opening station;

transferring the syringe body to a finger flange forming station by intermittently rotating the second machine section;

forming a perpendicular flat finger flange at the upper end of the syringe body by means of a slanting flame jet provided by slanting burner means, slanting and stationary mounted on the stationary machine frame at said finger flange forming station;

transferring the syringe body to a discharging station by intermittently rotating the second machine section; and discharging the syringe body at said discharging stations.

30. The method as claimed in claim 29, including translating the glass tube having its opened lower end, to a neck forming station by intermittently rotating the first machine section; and forming a neck portion at the lower end of the glass tube by rotary neck forming means horizontally and rotary mounted on the stationary machine frame, at the neck forming station.

31. The method as claimed in claim 29, including a plurality of heating and softening steps, for heating and softening the lower end of the glass tube and the upper end of the syringe body, preparing them to a forming step, and a plurality of fire finishing steps, for fire finishing each of neck portion, the tip and the finger flange.

32. A method for the manufacturing of syringes from a plurality of glass tubes in an intermittently horizontally rotary machine including a first and a second intermittently horizontally rotary machine sections, comprising:

vertically placing a plurality of long glass tubes in a first machine section of the intermittently horizontally rotary machine, intermittently rotating to a plurality of stations, mounted on a central axis of a stationary machine frame;

holding each continuously rotating tube by a rotary carrying sleeve stationary mounted on the stationary machine frame;

transferring a tube to an opening station by intermittently rotating the first machine section;

opening a closed lower end of the glass tube by means of a vertical flame jet directed upwardly provided by a vertical burner nozzle stationary mounted on the stationary machine frame at the opening station;

transferring the glass tube having its opened lower end, to a heating and softening station by intermittently rotating the first machine section;

heating and softening the lower end of the glass tube by means of a horizontal flame provided by a burner nozzle horizontally mounted at the stationary machine frame, at the heating and softening station;

transferring the glass tube having its opened lower end, to a neck forming station by intermittently rotating the first machine section;

forming a neck portion at the lower end of the glass tube by rotary neck forming rollers horizontally and rotationally mounted on the stationary machine frame at the neck forming station;

transferring the glass tube having its opened lower end, to a fire finishing station by intermittently rotating the first machine section fire finishing the neck portion of the glass tube by means of a horizontal flame provided by a burner nozzle horizontally mounted at the stationary machine frame, at the fire finishing station;

transferring the glass tube having the neck portion at its lower end, to a heating and softening station by intermittently rotating the first machine section;

heating and softening the neck portion of the glass tube by means of a horizontal flame provided by a burner nozzle horizontally mounted at the stationary machine frame, at the heating and softening station;

transferring the glass tube having a neck portion at it lower end, to a tip forming station by intermittently rotating the first machine section;

forming a tip for a needle, at the neck portion of the lower end of the glass tube, by means of rotary tip forming rollers horizontally and rotary mounted on the stationary machine frame at said tip forming station;

transferring the glass tube having the tip at its lower end, to a heating and softening station by intermittently rotating the first machine section;

heating and softening the tip of the glass tube by means of a horizontal flame provided by a burner nozzle horizontally mounted at the stationary machine frame, at the heating and softening station;

transferring the glass tube having the tip at its lower end, to a tip finishing station;

finishing the tip at the lower end of the glass tube, by means of a tip finishing mechanism mounted at the stationary machine frame at said tip finishing station, by introducing a punching needle at a vertical orifice of the tip;

transferring the glass tube having its finished tip at its lower end, to a fire finishing station by intermittently rotating the first machine section;

fire finishing the tip at the lower end of the glass tube by means of a horizontal flame provided by a burner nozzle horizontally mounted at the stationary machine frame, at the fire finishing station;

transferring the glass tube having its finished tip at its lower end, to a dimensioning station by intermittently rotating the first machine section;

releasing the glass tube having its finished tip by momentarily opening the chuck, and receiving the glass tube by means of a plate which lowers the glass tube at a distance corresponding to the length of the syringe body, which is afterwards held again by the chuck, at said dimensioning station;

transferring the glass tube, to a heating and softening station by intermittently rotating the first machine section;

heating and softening the lower end of the glass tube by means of a horizontal flame provided by a burner nozzle horizontally mounted at the stationary machine frame, at the heating and softening station, at a zone wherein a syringe body including the tip will be cutoff;

transferring the glass tube having the tip formed at its lower end, to a cutting off station;

cutting off a syringe body from the glass tube having the tip formed at its lower end, by means of a horizontal flame jet provided by burning nozzle horizontally mounted on the stationary machine frame at said cutting off station;

transferring the syringe body having a tip at its lower end and an upper closed end, to a second machine section of the intermittently horizontally rotary machine, intermittently rotating to a plurality of stations, mounted on a central axis of a stationary machine frame;

holding each continuously rotating syringe body by means of rotary gripping chuck stationary mounted on the stationary machine frame, at a receiving station;

transferring the syringe body, to a heating and softening station by intermittently rotating the second machine section;

heating and softening the closed upper end of the syringe body by means of a horizontal flame provided by a burner nozzle horizontally mounted at the stationary machine frame, at the heating and softening station;

transferring the syringe body to an opening station by intermittently rotating the second machine section;

opening the closed upper end of the syringe body, by means of a vertical flame jet directed downwardly provided by a vertical burner nozzle stationary mounted on the stationary machine frame at the opening station;

transferring the syringe body to a heating and softening station by intermittently rotating the second machine section;

heating and softening the opened upper end of the syringe body by means of a horizontal flame provided by a burner nozzle horizontally mounted at the stationary machine frame, at the heating and softening station;

transferring the syringe body to a finger flange forming station by intermittently rotating the second machine section;

forming a perpendicular flat finger flange at the upper end of the syringe body by means of a slanting flame jet provided by a slanting burner nozzle, slanting and stationary mounted on the stationary machine frame at said finger flange forming station;

transferring the syringe body to a fire finishing station by intermittently rotating the second machine section;

fire finishing the just formed finger flange by means of a burner nozzle horizontally and stationary mounted at the stationary machine frame at said fire finishing station;

transferring the syringe body to a discharging station by intermittently rotating the second machine section;

discharging the finished syringe body at said discharging station; and transferring the chuck to a conditioning station, by intermittently rotating the second machine section, for preparing the chuck to initiate another forming cycle.

* * * * *